Nov. 24, 1936. J. O. LEWIS 2,062,031
VALVE
Filed April 25, 1934 2 Sheets-Sheet 1

INVENTOR
James O. Lewis

Nov. 24, 1936.  J. O. LEWIS  2,062,031
VALVE
Filed April 25, 1934  2 Sheets-Sheet 2
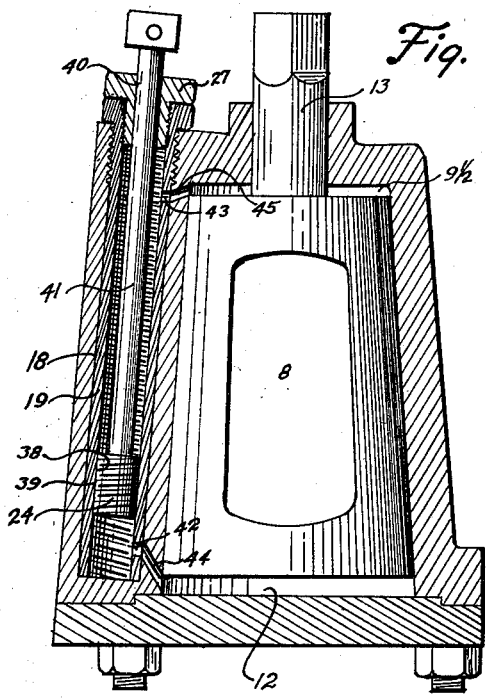
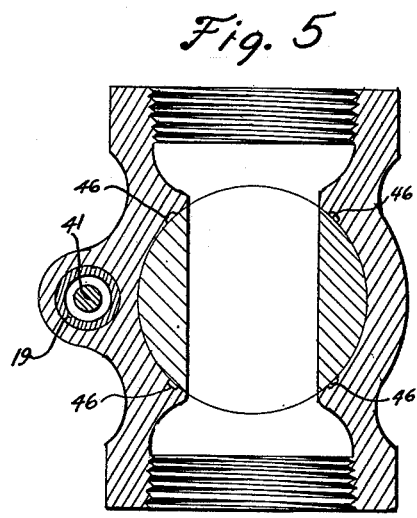
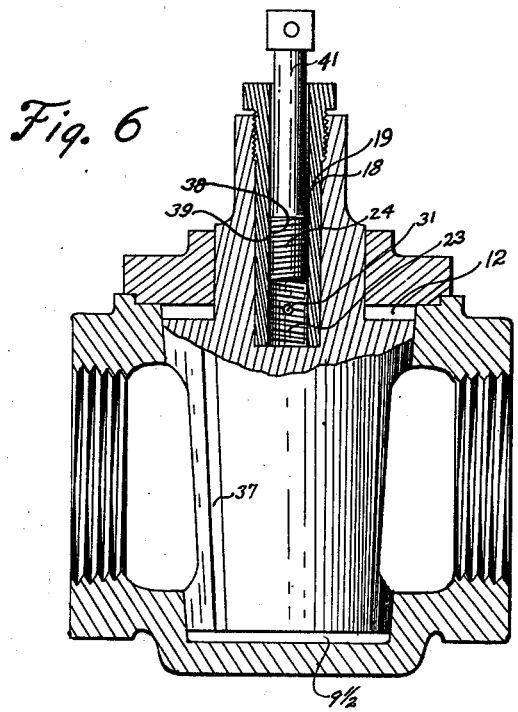
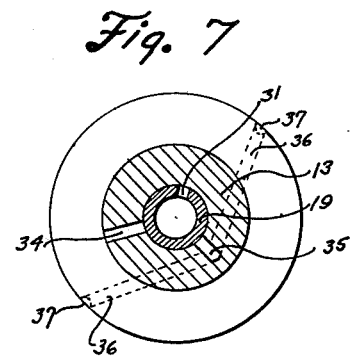
INVENTOR
James O. Lewis Patented Nov. 24, 1936

2,062,031

UNITED STATES PATENT OFFICE 2,062,031

VALVE

James O. Lewis, Tulsa, Okla., assignor to Dunn & Lewis, Tulsa, Okla., a partnership composed of Irwin L. Dunn and James O. Lewis Application April 25, 1934, Serial No. 722,273

29 Claims. (Cl. 251—93)

This invention relates to lubricated plug valves and has as a particular object using the lubricating system as a hydraulic means for either seating or unseating the tapered plug at the will of the operator.

In lubricated plug valves heretofore in use, means have been provided for forcing lubricants between the plug and its seat to effect greater ease of operation and to seal the space between the plug and its seat against leakage of the fluids being carried in the flow lines. In conjunction therewith means have been provided to force lubricants under the small end of the plug to raise it slightly off its seat in order to facilitate its rotation. Though this purpose is accomplished by this means, it is desirable that the plug be reseated again after turning in order that it make a tight seat to prevent leakage and to leave no space between the plug and its seat in which grit can lodge, corrosive fluids can act on the metal to roughen the seats or cement the plug to the body, or through which the lubricant can be blown out by fluid pressure or dissolved by gasoline, oil or other lubricant solvents in the line.

In my improvement I provide means not only for forcing the lubricant under the small end of the plug but selectively against the large end so that the plug can be unseated when it is to be turned and then forced securely onto its seat after turning. This alternate application of the lubricant first to one end and then to the other end likewise effects more complete lubrication of the seating surfaces and keeps all parts of the plug chamber filled with the lubricant, leaving no place for grit, corrosive fluids, or solvents to lodge in the body.

Further objects of my invention are to provide positive means for directing the lubricant, for withdrawing lubricants from one end of the plug chamber, while forcing lubricants into the other end, for an improved pressure chamber wherewith lubricants can be either introduced into the valve or withdrawn from either or both ends of the valve chamber in order to remove deteriorated lubricants, to provide an improved means to prevent leakage around the stem without recourse to packing glands around the stem or gaskets against the stem end of the plug, and finally to provide simple and economical construction to accomplish the foregoing purposes.

In Figure 1, I show a sectional view of my preferred form with the plug at half open position and partly in elevation.

Figure 4 is a vertical sectional view of another embodiment of my invention.

Figure 5 is a longitudinal section of Figure 4.

Figure 6 is a vertical sectional view of a third embodiment of my invention.

Figure 7 is a transverse section through the stem of Figure 6 showing the sleeve port and the cooperative passages.

Figure 1:
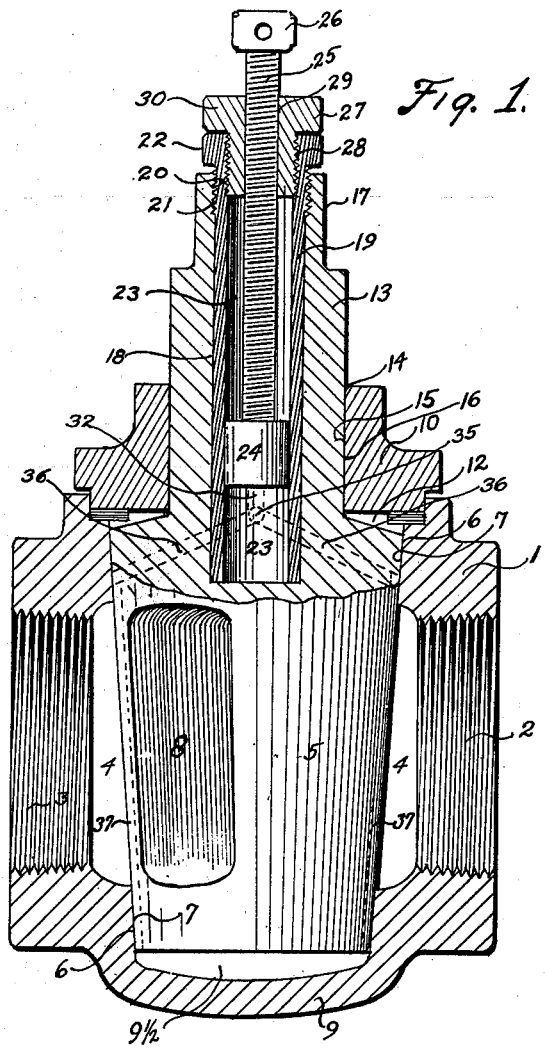
Figure 2:
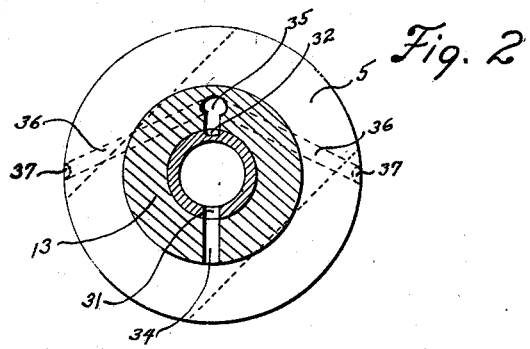
Figure 2 is a section through the stem at the top of the plug, particularly showing the grease ports to the sleeve for compressing the liquid.
Figure 3:
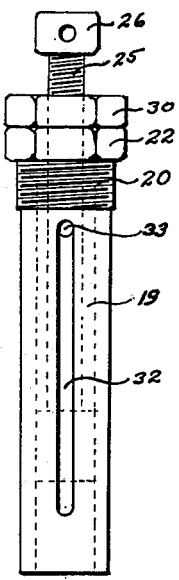
Figure 3 is an elevation of the sleeve member.

In Figures 1, 2, and 3, I show my preferred form. The numeral 1 designates the valve housing with through ports 2 and 3 adapted to cooperate with sections of the flow line not shown. The housing is provided with a transverse chamber 4 adapted to receive a tapered rotatable plug 5, the chamber having ground seats 6, cooperative with the seating surface 7 of the plug. The plug has a through port 8 cooperative with the housing ports 2 and 3. The plug is fluid tightly enclosed in the housing, there being an end wall 9 at the small end of the plug preferably integral with the housing and at the large end of the plug an end wall consisting of a removable bonnet 10 fastened and seated to the body by conventional means. Between the small end of the plug 5 and the end wall 9 is a space 9½ adapted to hold lubricants and between the large end of the plug and the bonnet 10 is the space 12 likewise adapted to receive lubricants and to permit limited axial movement of the plug. At the large end of plug is the stem 13 preferably integral with the plug. This passes through the opening 14 of the bonnet, the jointure being sealed against leakage preferably by providing cooperative ground seats 15 and 16 respectively on the stem and in the opening, which is sealed by the grease forced into the space 12. Conventional packing means may be used but it must be of such nature as to permit sliding movement of the stem, where the latter is integral with the plug as shown.

At the top of the stem is the squared portion 17 adapted to receive a wrench for rotating the plug. The stem is provided with the chamber 18, in which is inserted a rotatable sleeve 19 closely fitting the chamber. The sleeve is preferably held against outward thrust by threads 20 at the top engaging threads 21 in the stem. The hexagonal portion 22 provides a means whereby the sleeve 19 can be rotated. The sleeve provides a pressure lubricating chamber 23, which has a piston 24 attached to a screw 25 with a squared portion 26 at the top for turning the screw, thus moving the piston inward or outward in the lubricating chamber 23 and exerting pressure on the lubricant either above or below the piston. The top of the sleeve 19 is provided with a closure 27, screw threaded to the sleeve at 28, and with a threaded opening 29 to engage the threads on the pressure screw 25. The closure 27 has a hexagonal portion 30 adapted to receive a wrench. Near the bottom of the sleeve 19 is a small port 31 and on the opposite side of the sleeve is the groove 32, formed in the outer face and extending from directly opposite the port 31 to a point near the top of the sleeve 23 to align with the port 33 extending through the wall of the sleeve. In the stem 13 is the port 34 communicating with space 12 above the plug. Directly opposite is the port 35 communicating with the passages 36 through the plug, which connect with grooves 37, that extend down the sides of the plug from points near the top to the space 9½.

Having described the parts of my preferred form, I will now describe the operations thereof. The valve is assembled with the spaces 9½ and 12 filled with a heavy lubricating grease suitable for the purpose. Grease is introduced into the pressure chamber 23 by unscrewing the plug 27 and taking out the plug with screw stem 25 and its piston 24. Grease is put into the chamber 23 to fill it about half way. Grease is then molded around the screw 25 between the piston 24 and the plug 27 and the assemblage replaced in the chamber 23. When the screw 25 is turned to the right, the piston 24 is forced downwardly, grease flows through the ports 31 and 34 into the space 12 above the plug and forces it downward onto its seat. When the screw 25 is turned to the left, the grease is forced out of port 33, down the groove 32 through the port 35, the passages 36 and the grooves 37 to the space 9½, thus exerting an upward thrust on the plug 5, which moves it axially off its seat.

It will be seen also that when the screw is moved to exert pressure on one end of the plug 5 by forcing grease into the space at that end, the grease can pass back through the channels into the lubricating chamber 23 to the space on the opposite side of the piston 24. Thus it is to be seen that as grease is injected into one space it is being withdrawn from the other. Preferably the areas above and below the piston 24 should be in the same proportion as the spaces above and below the plug 5.

In refilling the chamber 23 with grease at times when the valve is full of fluids under pressure, I turn the sleeve 19 one quarter in which position the ports 31 and 33 are out of communication with the interior of the valve so that the fluid pressure cannot blow back into the chamber 23 and interfere with refilling it, but in the event it is desired to remove deteriorated grease in the body, it can be allowed to blow. In this way grease can be changed or a washing solution forced through the plug and then removed.

Though I prefer to connect the ports 31 and 33 in the manner shown so that the plug 5 will move in the same direction as the screw 25, I can by a half turn bring port 31 opposite port 35 and groove 32 opposite port 34, in which position the flow of lubricants from the pressure chamber into the valve is reversed so that as the screw 25 is turned downward, the plug 5 lifts and as it is turned upward, the plug 5 is forced downward against its seat.

Having described the construction and operation of my preferred forms, I now proceed to describe two alternate forms.

In Figures 4 and 5, I show a form wherein the lubricating chamber is in the body wall alongside the plug and not in the stem. In this form an inverted plug is preferable in order that the top and bottom cross sectional areas may be kept in proportion to the areas above and below the piston 24. In this form the piston 24 is provided with screw threads 38 cooperative with screw threads 39 on the interior of the sleeve 19, there being a slide joint at 40 between the stem 41 that rotates the piston and the plug 27. Ports 42 and 43 are provided through the walls of the sleeve 19 respectively near the bottom and top of the lubricating chamber 23 and these ports cooperate respectively with passages 44 and 45, through the walls of the valve and communicate respectively with the spaces 12 and 9½. By turning the stem 41 to the right, grease is forced through into the space 9½ and drawn out of the space 12, whereas by turning the stem to the left grease is forced into the space 12 and withdrawn from the space 9½. By turning the sleeve 19, the ports 42 and 43 can be shut off from the passages 44 and 45, so that grease can be introduced into the pressure chamber without interference from line pressure. In order to provide better lubrication of the seating surface, I provide longitudinal grooves here shown in the walls of the valve body at 46, these grooves extending from the small end of the plug to points short of the large end of the plug.

In Figures 6 and 7 I show a third embodiment of my invention of simplified construction. In this form I can selectively force grease into either space 9½ or 12 but I provide no means for withdrawing the grease from one space while injecting grease into the other except by squeezing around the plug. Also I can back up the piston 24 and let the grease blow back into the chamber 23 under line pressure. In this form the pressure is by screwing downwards only, which eliminates the need for the plug 27 at the top of the sleeve. In operating the valve the sleeve 19 is turned so that port 31 is in cooperative position with passage 34, if the plug is to be seated and when the plug is to be raised, the sleeve is turned till port 31 is in cooperative position with port 35 and passages 36 and 37, which forces the grease into the space 9½, thus lifting the plug. When the grease chamber 23 is to be refilled, the sleeve is turned until the port 31 is cut off from communication with both spaces as shown in Figure 7.

It will be noted that by the means here disclosed, more effective lubrication is had of the seating surfaces between the plug and the body and the spaces therebetween are more effectively sealed as the grease pressure is applied from both top and bottom and the plug can be worked back and forth to effect more even spread of the grease. By this means also close adjustment can be made of pressure against the seat so as to get effective sealing and, at the same time, easier rotation of the plug can be had consistent with effective sealing. Likewise, forcing the plug downward on its seat under great fluid pressure tends to squeeze the grease into all parts and to make a thinner and tighter seal that prevents the grease being blown out by pressure, or carried away by solvents and it allows no space into which dirt or corrosive fluids can be carried. It will likewise be noted that no unfilled space is left at either the top or the bottom of the plug into which dirt or destructive fluids can lodge or water freeze and burst the valve. Filling the space at the stem end of the plug with grease and forcing grease into the jointure of the stem and the bonnet makes practical replacement of the conventional packing glands with a ground or machined contact at a saving in expense and permitting easier rotation of the plug.

While my invention is designed primarily to cooperate with tapered plug valves, it is to be noted that my lubricating means can also be applied to other forms of valves.

What I claim and desire to secure by Letters Patent is:

1. In combination with a valve, a valve body housing a valve member, pressure lubricating means comprising a chamber, a sleeve movable in the chamber with a closure at the top and adapted to be used as a lubricating chamber, a piston movable in the sleeve, lubricating grease in the lubricating chamber above and below the piston, means to move the piston to apply pressure selectively to the grease above and below the piston, said sleeve having ports through the sleeve wall near the top and bottom of the lubrication chamber cooperating with passages in the valve body communicating with the lubricated parts of the valve, and means for moving the sleeve to selectively aline the ports with the cooperative passages and to move the ports out of alinement with their cooperative passages.

2. In combination with a rotary valve, a valve housing enclosing a tapered plug, pressure lubricating means comprising a chamber, a sleeve movable in the chamber with a closure at the top and adapted to form a pressure chamber, a piston axially movable in the sleeve, a liquid occupying the pressure chamber above and below the piston, means to move the piston to impart pressure selectively to the liquid above and below the piston, said sleeve having a port through the sleeve wall near the top of the pressure chamber, cooperating with a passage in the valve housing to one end of the plug and a port through the sleeve wall near the bottom of the pressure chamber cooperating with a passage in the valve housing to the other end of the plug.

3. In combination with a rotary valve, a valve housing fluid tightly enclosing a tapered plug, cooperative seats in the housing and on the plug, said plug being arranged to provide spaces between the housing and the top and bottom of the plug, pressure lubricating means comprising a chamber with closures at the top and bottom thereof, said chamber having a port through the chamber wall near the top thereof cooperative with means for transporting lubricant to one of said spaces and a port through the chamber wall near the bottom thereof cooperative with means for transporting lubricant to the other space, and a piston movable in said chamber and operable to selectively force lubricants into one space while withdrawing lubricants from the other in order to selectively seat and unseat the plug and to grease the seating surfaces thereof.

4. In combination with a rotary valve, a valve housing fluid tightly enclosing a tapered plug, cooperative seats in the housing and on the plug, said plug being arranged to provide spaces at the top and bottom of the plug and between the respective end walls of the housing, pressure lubricating means comprising a chamber with a closure at the bottom, a movable sleeve in the chamber and with a closure at the top, said sleeve having a port through the sleeve wall near the top thereof cooperative with means for transporting lubricants to one of said spaces and a port through the sleeve wall near the bottom thereof cooperative with means to transport lubricant to the other of said spaces, a piston movable in said chamber and operable to selectively force lubricants through one port into one of said spaces while withdrawing lubricants from the other space through the other port in order to selectively seat and unseat the plug and to lubricate the seating surfaces thereof, and means for moving the sleeve so as to move said ports selectively into and out of cooperation with said transporting means.

5. In combination with a rotary valve, a housing fluid tightly enclosing a rotatable core comprising a tapered plug and a stem for rotating the same, said plug being arranged to provide spaces between the top and bottom of the plug and the respective end walls of the housing, cooperative seating surfaces in the housing and on the plug, a chamber in the core, a sleeve rotatable in the chamber, a removable closure at the top of the sleeve, a plunger in the sleeve with a screw member extending outwardly through the closure and screw threadedly engaging it, the area under the plunger being in like proportion to the annular area above the plunger as the bottom area of the plug is to the top annular area of the plug, means for turning the screw member, said sleeve having a port near the bottom thereof and the core having a passage alinable with said port and communicating with the space at the large end of the plug, said sleeve also having a port near the top thereof and a channel in its outer surface extending downwardly from said port to a point radially opposite the lower port, the core having a passage alinable with the lower end of said channel and communicating by means of grooves in the seating surfaces of the plug with the space at the small end thereof, a lubricating grease in said sleeve above and below the plunger that is forced to the small end of the plug to lift it off its seat when the screw member is turned up while the grease at the top space flows back below the plunger and that is forced to the large end of the plug when the screw member is turned downward to seat the plug while the grease under the plug flows into the space above the plunger, and means for rotating the sleeve to turn the sleeve ports out of alinement with their respective cooperative passages so that the closure can be removed and grease inserted in the sleeve without interference from pressure in the valve.

6. In combination with a rotary valve, a housing fluid tightly enclosing a tapered plug, and rotatable therein, said plug being arranged to provide spaces between the top and bottom of the plug and the respective end walls of the housing, cooperative seating surfaces in the housing and on the plug, a pressure lubricating means comprising a chamber in the walls of the housing, a sleeve rotatable in the chamber, a removable closure at the top of the sleeve, a piston in the sleeve screw threadedly engaging the walls thereof, a stem on the piston extending through the closure and adaptable to turn the piston and impart longitudinal movement thereto, said sleeve having ports respectively near the top and bottom thereof and said housing having passages through the wall thereof alinable respectively with the sleeve ports and communicating respectively with spaces at either end of the plug, the pressure areas above and below the piston being in the same proportion as the pressure areas in the spaces at the ends of the plug, a lubricating grease in the sleeve above and below the piston, the lubricating means being operable to force grease from above the piston into its cooperative space while withdrawing grease from below the piston from its cooperative space when the piston is screwed upward and for forcing grease below the piston to its cooperative space, and means for rotating the sleeve so as to cut off communication between the sleeve ports and their cooperative passages so that the sleeve can be loaded with grease without interference from pressure in the valve.

7. In combination with a rotary valve, a housing fluid tightly enclosing a tapered plug rotatable therein, said plug being arranged to provide spaces between the top and bottom of the plug and the respective end walls of the housing, cooperative seating surfaces in the housing and on the plug, a stem at the large end of the plug and integral therewith having a chamber extending into the plug, a sleeve rotatable in the chamber, means for rotating the sleeve, said sleeve having a port near the bottom thereof, said plug having a passage therethrough communicating with the space at the stem end and alinable with said port and a passage having one end alinable with said port and the other end communicative with grooves in the seating surfaces that extend to the space at the small end of the plug, and a screw in the sleeve engaging threads therein and adapted to force lubricant into the space at the large end of the plug to seat it when the port is in alinement with the passage communicating with the space at the large end of the plug and to force lubricant under the plug to lift it off its seat when the port is rotated into alinement with the passage communicating with the small end, the sleeve being refillable without interference from pressure in the valve, when the sleeve is rotated out of alinement with the passages.

8. In a rotary valve, a housing, a tapered plug in the housing, cooperative seats in the housing and on the plug, a fluid supply chamber individually connected with the housing at the respective ends of the plug, and a single actuator in said fluid supply chamber operable for selectively applying pressure to fluid in said chamber to act against the small end of the plug to force it off its seat and return fluid from the large end of the plug to said chamber and to apply pressure against the large end of the plug to force it onto its seat and return fluid from the small end of the plug to said chamber.

9. A valve including a housing, a tapered plug in the housing, cooperative seats in the housing and on the plug, said housing being spaced from each end of the plug, and a source of fluid supply including a single actuator for selectively forcing fluid from the source of supply into the space at one end of the plug while withdrawing fluid from the space at the other end of the plug for return to the source of supply.

10. A rotary valve including a housing, a plug having fluid tight contact with the housing, cooperating seats in the housing and on the plug having grooves for spreading lubricant, said housing being spaced from the ends of the plug and said seats, and a single actuator in the housing for selectively and alternately moving lubricant to said spaces for reciprocably moving the plug and lubricating said seats.

11. In a valve of the character described including a housing, a plug rotatable and reciprocable in the housing, cooperative seats in the housing and on the plug having grooves in one of said seats, said housing having spaces at each end of the plug, a lubricant chamber connected with said spaces, and a single actuator in the chamber for selectively forcing lubricant into one of said spaces and for drawing lubricant from the other space for reciprocably moving the plug and supplying lubricant to said grooves for lubricating said seats.

12. In a valve of the character described including a housing, a plug rotatable and reciprocable in the housing, cooperative seats in the housing and on the plug having grooves in one of said seats, said housing having spaces at each end of the plug, a lubricant chamber connected with said spaces, a piston reciprocable in the chamber for dividing the chamber into lubricant storage and compressing compartments, means for operating the piston to selectively force lubricant from the compressing compartment into one of said spaces and for withdrawing lubricant from the other space for return to the storage compartment, thereby effecting reciprocable movement of the plug and lubrication of said seats.

13. In combination with a valve of the character described having surfaces to be lubricated, a lubricant storage chamber having ports at its opposite ends and having communication with the parts to be lubricated, a piston reciprocable in said chamber between the ports, and means for selectively actuating the piston for forcing lubricant from one end of the chamber through one port and drawing lubricant through the other port to the opposite end of the chamber.

14. In combination with a valve of the character described including a housing and a valve plug in the housing, a liquid storage chamber having ports at its opposite ends and having communication with the respective ends of the plug, a piston having threaded connection with the chamber between said ports, and means for rotating the piston for forcing lubricant from one end of the chamber through one port and drawing lubricant through the port at the opposite end of the chamber.

15. In combination with a lubricated valve, pressure lubricating means including a chamber having a port communicating with the parts of the valve to be lubricated, a sleeve movable in said chamber having a port alignable with said chamber port, means in the sleeve for compressing lubricant therein to selectively force and withdraw said lubricant through the ports when in alignment to and from the parts of the valve to be lubricated, and means for moving said sleeve to disalign the ports to prevent back flow from the valve and to permit recharging of the sleeve with lubricants.

16. In combination with a lubricated valve, pressure lubricating means including a chamber having a port communicating with the parts of the valve to be lubricated, a sleeve movable in said chamber having a port alignable with said chamber port, means in the sleeve for selectively exerting and relieving pressure on the lubricant therein for selectively supplying and withdrawing lubricants to and from the valve when the ports are in alignment, and means for moving said sleeve to disalign the ports to prevent back flow from the valve and to permit recharging the sleeve with lubricants.

17. In combination with a lubricated valve, pressure lubricating means including a chamber having a port communicating with the parts of the valve to be lubricated, a lubricant storage and compression member in said chamber comprising a sleeve movable in said chamber and having a port alignable with the chamber port, an actuator in said sleeve adapted to compress and to relieve pressure on the lubricants therein, and means for moving the sleeve to selectively bring said ports into alignment to permit lubricants to flow from the sleeve to the valve and from the valve to the sleeve under impulse of the actuator and to disalign the ports to permit removal of the actuator and recharging of the sleeve with lubricants.

18. In combination with a lubricated valve including a housing, a core rotatable in the housing and having a passageway communicating with parts of the valve to be lubricated, a stem on the core for rotating said core, a chamber in the core, a sleeve movable in the chamber and having a port registrable with said passageway, means within the sleeve for compressing lubricants therein to selectively force and withdraw said lubricants through said port and passageway when in alignment to and from the parts to be lubricated, and means for moving the sleeve for disaligning said port and passageway to prevent back flow from the valve and to permit recharging of the sleeve with lubricants.

19. In combination with a lubricated valve, a housing having a chamber formed in a wall thereof and provided with a passageway communicating with parts of the valve to be lubricated, a plug rotatable in the housing, a sleeve movable in the chamber and having a port adapted to register with said passageway, means within the sleeve for compressing lubricants therein to selectively force and withdraw said lubricants through said port and passageway when in alignment to and from the parts to be lubricated, and means for moving the sleeve for disaligning the port and passageway to prevent back flow from the valve and to permit recharging of the sleeve with lubricants.

20. In a valve of the character described including a housing, a plug rotatably and reciprocably movable in the housing, and a closed hydraulic pressure generating means incorporated in the housing and having a single actuator adapted to selectively apply and relieve pressure to and from the respective ends of the plug for reciprocably moving the plug in the housing.

21. In a valve of the character described including a housing, a plug rotatably and reciprocably movable in the housing, and a closed hydraulic pressure generating means incorporated in the housing of the valve and having a single actuator adapted to selectively apply and relieve pressure to and from the respective ends of the plug for reciprocably moving the plug in the housing.

22. In a valve of the character described including a housing, a plug rotatably and reciprocably movable in the housing, cooperative seats in the housing and on the plug, and a closed hydraulic pressure generating means incorporated in the valve having closed circuit connections with the ends of the plug and having a single actuator cooperating with the closed circuit connections and adapted to selectively apply and relieve pressure to and from the respective ends of the plug for reciprocably moving the plug in the housing.

23. In combination with a line and a rotary valve in the line including a housing, a plug rotatably and reciprocably movable in the housing, and a fluid pressure generating means incorporated in the valve and provided with a single actuator adapted to selectively apply and relieve pressure to and from the respective ends of the plug for reciprocably moving the plug in the housing.

24. In a valve of the character described including a housing, a tapered plug rotatably and reciprocably movable in the housing, cooperative seats in the housing and on the plug having grooves in one of said seats, and a closed hydraulic pressure generating means incorporated in the valve and provided with a single actuator adapted to selectively apply and relieve pressure to and from the respective ends of the plug for reciprocably moving the plug in the housing and for supplying lubricants to said grooves.

25. In a valve of the character described including a housing, a plug rotatable and reciprocable in the housing, cooperative seats in the housing and on the plug, said housing having spaces at each end of the plug, a lubricant chamber connected with said spaces, and a single actuator in the chamber for selectively forcing lubricant into one of said spaces and for drawing lubricant from the other space for reciprocably moving the plug.

26. In a valve of the character described including a housing, a plug rotatable and reciprocable in the housing, cooperative seats in the housing and on the plug, said housing having spaces at each end of the plug, a lubricant chamber connected with said spaces, a piston reciprocable in the chamber for dividing the chamber into lubricant storage and compressing compartments, means for operating the piston to selectively force lubricant from the compressing compartment into one of said spaces and for withdrawing lubricant from the other space for return to the storage compartment, thereby effecting reciprocable movement of the plug and lubrication of said seats.

27. In a valve of the character described including a housing, a tapered plug rotatable in the housing, co-operative seats in the housing and on the plug having grooves in one of the seats, and a closed hydraulic pressure generating means incorporated in the valve and provided with a single actuator adapted to selectively apply and relieve pressure to and from the respective ends of the plug for reciprocably moving the plug in the housing and for supplying lubricant to said grooves.

28. A valve of the character described having surfaces to be lubricated, a lubricant containing pressure chamber having means communicating with said surfaces, and a piston reciprocably movable in said chamber between said communicating means for selectively imparting pressures to the lubricant on one side of said piston and relieving pressures on the opposite side of said piston to lubricate said surfaces.

29. In combination with a lubricated valve, a chamber having a port communicating with parts of the valve to be lubricated, and a lubricant storage member in said chamber having a movable sleeve provided with a port selectively alignable and disalignable with said chamber port for permitting reversible flow of lubricant therethrough to and from the parts to be lubricated when the ports are aligned and for preventing flow therethrough when the ports are disaligned.

JAMES O. LEWIS.